United States Patent

Prenzel et al.

[11] Patent Number: 6,000,927
[45] Date of Patent: Dec. 14, 1999

[54] PASTE EXTRUDER

[75] Inventors: Karl Prenzel, Schwabach; Paul Glowacki, Erlangen, both of Germany

[73] Assignee: W K Worek Kunststofftechnik GmbH, Adelsdorf/Neuhaus, Germany

[21] Appl. No.: 09/005,586

[22] Filed: Jan. 12, 1998

[30] Foreign Application Priority Data

Jan. 11, 1997 [DE] Germany .......................... 197 00 723

[51] Int. Cl.$^6$ .................................................. B29C 47/20
[52] U.S. Cl. .......................... 425/190; 425/380; 425/381; 425/466; 425/467
[58] Field of Search ..................................... 425/190, 380, 425/381, 467, 466; 419/67; 72/264

[56] References Cited

U.S. PATENT DOCUMENTS 1,771,620  7/1930  Ehrmann .................................... 72/264
3,241,346  3/1966  Doss ........................................... 72/264

*Primary Examiner*—Harold Pyon
*Assistant Examiner*—Joseph Leyson
*Attorney, Agent, or Firm*—Venable; George H. Spencer; Ashley J. Wells

[57] ABSTRACT

A paste extruder includes a machine frame; an extrusion barrel seated in the machine frame and having an open end; an extrusion die connected to the open end of the extrusion barrel; and a mandrel rod which is arranged coaxially inside of the extrusion barrel, which has a mandrel tip, and which cooperates with the extrusion die, wherein the mandrel rod is comprised of a mandrel rod tube and an inner mandrel having a portion positioned proximate to the extrusion die which projects from the mandrel rod tube and having a portion arranged inside of the mandrel rod tube which has a first section arranged at a radial distance from the mandrel rod tube, and which has a second section rigidly connected with the mandrel rod tube, and wherein the first section has an elastic element which acts transversely to one of the axial direction or the direction of extrusion.

6 Claims, 1 Drawing Sheet

PASTE EXTRUDER

BACKGROUND OF THE INVENTION

1. Field of the Invention

The invention relates to a paste extruder. Such machines are employed to produce profiled sections, in particular, from PTFE. In an extruder of this type, an extrusion barrel is seated on a machine frame, the extrusion barrel being connected to an extrusion die. With an extrusion piston of the extrusion barrel, a parison material comprised of PTFE powder is pressed out through an opening of the extrusion die which is shaped to correspond to the desired profile. By way of a subsequent conditioning process, the powdered material is sintered together to form a solid PTFE material. For the production of pipes, a mandrel rod is arranged coaxially in the extrusion barrel. On the front end of the mandrel rod facing the extrusion die, a mandrel tip is arranged which projects into the extrusion opening of the extrusion die and keeps open the interior chamber of a pipe.

2. Description of the Related Art

For the production of, in particular, thin-walled pipes, the problem arises that, during feeding with a parison material or a parison body, a time-consuming centering of the mandrel in the extrusion opening of the extrusion die must be carried out. It is furthermore problematic that, with rigid mandrel rods, the mandrel rod is deflected transversely to the axial direction because of different material densities, etc. of the parison body or due to geometric errors, thus resulting in varying wall thicknesses of the pipe, which is not desirable for obvious reasons.

On this basis, it is the object of the invention to propose a paste extruder wherein these drawbacks are circumvented.

SUMMARY OF THE INVENTION

This object is solved by a paste extruder having a machine frame, an extrusion barrel, an extrusion die and a mandrel rod, which is arranged coaxially inside of the extrusion barrel and, with a mandrel tip, cooperates with the extrusion die, characterized in that the mandrel rod is comprised substantially of two main parts, namely a mandrel rod tube and an inner mandrel whose portion that is disposed close to the extrusion die projects from the mandrel rod tube and whose portion that is arranged inside of the mandrel rod tube has a first section, which is arranged at a radial distance from the mandrel rod tube, and a second section, which is rigidly connected with the mandrel rod tube, with the first section having an elastic element which acts transversely to the axial direction or direction of extrusion. Accordingly, the mandrel rod is comprised substantially of two main parts, namely a mandrel rod tube and an inner mandrel. With its portion that is disposed close to the extrusion die, the inner mandrel projects from the mandrel rod tube. The portion that is arranged inside of the mandrel rod tube is subdivided into two sections, with the first section being arranged at a radial distance from the mandrel rod tube or with respect to its inside wall and the second section being rigidly connected to the mandrel rod tube. The first section has an elastic element which is active transversely to the axial direction or extrusion direction. This feature effects virtually a self-centering of the mandrel tip or of the inner mandrel during the extrusion of hollow profiled sections, which will be explained further below in greater detail.

The elastic element preferably is a region having a smaller diameter. It is preferred that all sections of the inner mandrel be made from the same material. But, if it is expedient, different materials can also be used. A further advantageous feature is comprised in that, forward of the elastic element in the direction of extrusion, a damping element is arranged on the outer circumference of the inner mandrel; the damping element acts transversely to the axial direction and cooperates with the inside wall of the mandrel rod tube. Preferably, the damping element is a ring made from an elastic material which is inserted in a recess of the inner mandrel.

BRIEF DESCRIPTION OF THE DRAWINGS

The invention is now explained in greater detail by way of an embodiment which is illustrated in the figures. The figures show.

DESCRIPTION OF THE PREFERRED EMBODIMENTS

Figures 1, 2:
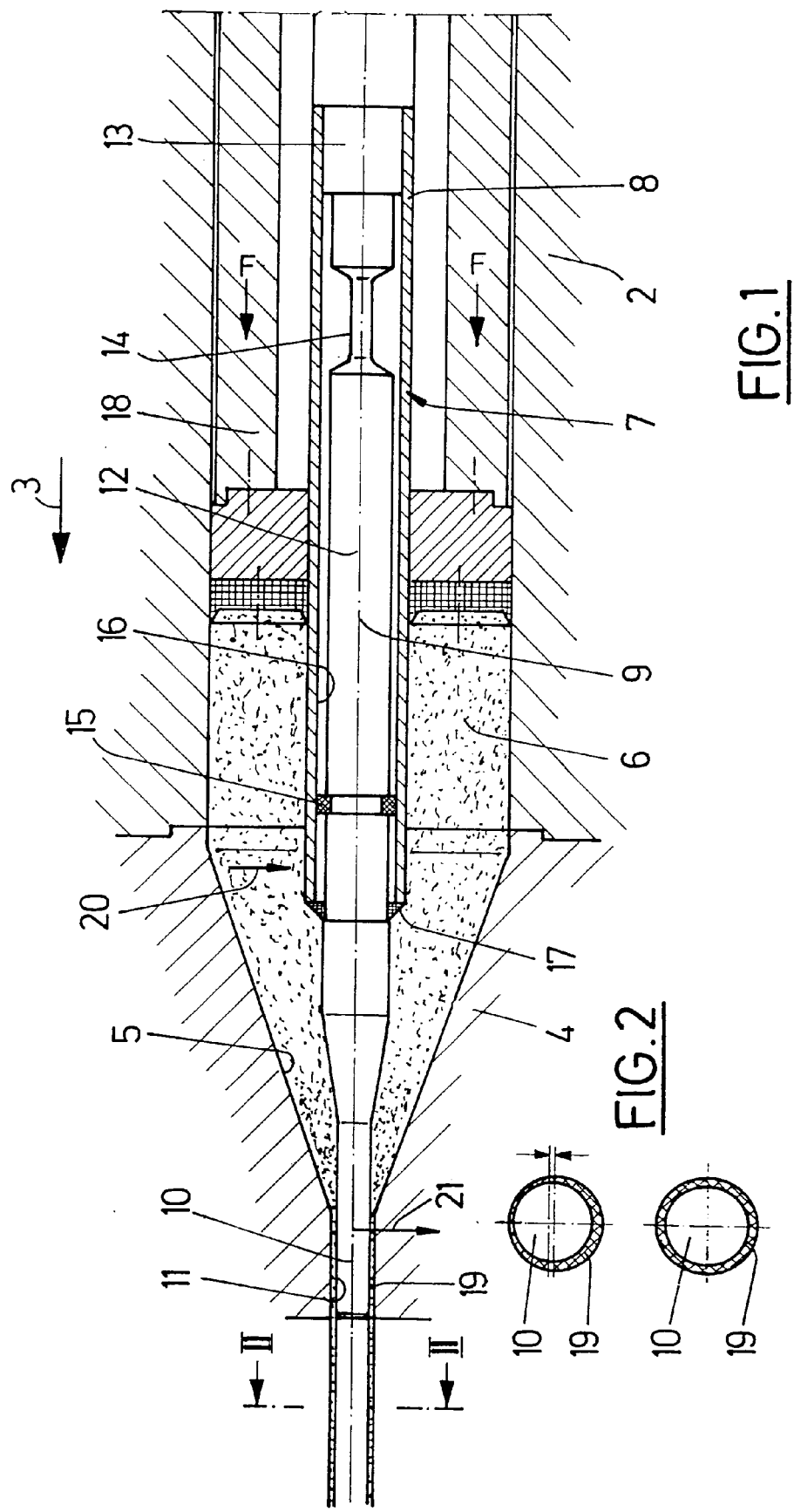
FIG. 1 the front region of a paste extruder illustrating an extrusion die, an extrusion barrel and a mandrel rod, partially in sectional representation, and FIG. 2 a cross section along the line A—A in FIG. 1.

As is indicated in FIG. 1, a paste extruder according to the invention comprises a machine frame (not shown), in which an extrusion barrel 2 is seated. The extrusion barrel 2 is open in the direction of extrusion 3 and is connected at its front end, that is, open end, to an extrusion die 4. Together, the front end of the extrusion barrel 2 and the extrusion die 4 form a receiving chamber 5 for a parison body 6 comprised of the material to be extruded, particularly PTFE powder. The parison body substantially has the shape of a hollow cylinder.

A mandrel rod 7 is centrally seated in the extrusion barrel 2. The mandrel rod is composed of two main parts, namely the mandrel rod tube 8 and an inner mandrel 9. With its front end, the inner mandrel projects from the mandrel rod tube and carries a mandrel tip 10, which centrally projects into an extrusion opening 11 of the extrusion die 4. The portion of the inner mandrel 9 arranged inside of the mandrel rod tube 8 is provided with a first section 12 and a second section 13. While the second section 13 is fixedly connected to the inside circumference of the mandrel rod tube 8, the first section 12 is at a radial distance from the mandrel rod tube 8. In the first section 12, an elastic element 14 is arranged as closely as possible to the second section 13; the elastic element acts transversely to the axial direction or the direction of extrusion 3. In the embodiment shown in FIG. 1, the elastic element 14 is formed by a region having a smaller diameter. At a distance forward of the elastic element 14, a damping element 15 is arranged on the outer circumference of the inner mandrel 9; the damping element acts transversely to the axial direction and cooperates with the inside wall 16 of the mandrel rod tube 8. The damping element 15 is a ring made from an elastic material which is inserted in a recess of the inner mandrel 9. The front end of the mandrel rod tube 8 or the gap space between the outside circumferential surface of the inner mandrel 9 and the inside wall 16 of the mandrel rod tube 8 is sealed by an annular seal 17.

When in operation, the extrusion piston 18 of the extrusion barrel 2 is charged with a force F by an appropriate drive and is moved in the direction of extrusion 3. During this process, the parison body 6 is compressed and pressed outward through the annular gap 19 formed by the mandrel tip 10 and the extrusion opening 11. During this extrusion process, it happens that transverse forces 20 acting transversely to the direction of extrusion 3 act on the end of the mandrel rod tube 8 projecting from the extrusion barrel.

During this process, the end of the mandrel rod tube 8 can be deflected in the direction of arrow 20. For conventional paste extruders, in which the mandrel rod 7 is a rigid unit, this has the effect that the annular gap 19 becomes unsymmetrical and has a shape which corresponds to the top illustration of FIG. 2. But the most important problem with rigid mandrel rods of conventional paste extruders is the centering of the inner mandrel or of the mandrel tip 10, e. g., when the extruder is fed with a new parison body 6. Due to production tolerances or the like, geometric errors occur frequently which are very difficult to compensate for by means of adjustments. A mandrel tip 10, which does not extend precisely coaxially with respect to the extrusion opening 11 of the extrusion die 4, is practically not in a position to center itself during the extrusion process because of the rigid design of conventional mandrel rods. This is different, however, in a paste extruder according to the invention. The inner mandrel 9 supporting the mandrel tip 10 has a mobility or flexibility which extends transversely to the direction of extrusion because of the elastic element 14. In this manner, geometric errors or, for example, transverse forces 20 acting on the mandrel rod tube can be compensated. This can be done because the mandrel tip 10 is centered in a self-acting manner during the extrusion process. This self-acting centering is possible because, owing to the elastic element 14, the inner mandrel can be deflected transversely to the direction of extrusion 3. This deflection is damped by the damping element 15. Due to a corresponding material selection for the damping element, it is possible to thus influence the vibration behavior or bending behavior of the inner mandrel transversely to the direction of extrusion 3.

What is claimed is:

1. A paste extruder, comprising:
    a machine frame;
    an extrusion barrel seated in the machine frame and having an open end;
    an extrusion die connected to the open end of the extrusion barrel; and
    a mandrel rod which is arranged coaxially inside of the extrusion barrel, which has a mandrel tip, and which cooperates with the extrusion die,
    wherein the mandrel rod is comprised of a mandrel rod tube and an inner mandrel having a portion positioned proximate to the extrusion die which projects from the mandrel rod tube and having a portion arranged inside of the mandrel rod tube which has a first section arranged at a radial distance from the mandrel rod tube, and which has a second section rigidly connected with the mandrel rod tube, and
    wherein the first section has an elastic element which acts transversely to one of the axial direction or the direction of extrusion.

2. The paste extruder according to claim 1, wherein the elastic element is a region having a diameter which is smaller than that of the inner mandrel.

3. The paste extruder according to claim 1, further comprising a damping element which is arranged in the direction of extrusion at a distance forward of the elastic element on the outer circumference of the inner mandrel and which acts transversely to the direction of extrusion and cooperates with the inside wall of the mandrel rod tube.

4. The paste extruder according to claim 3, wherein the inner mandrel is provided with a recess, and wherein the damping element is a ring comprised of an elastic material and is inserted in the recess provided in the inner mandrel.

5. The paste extruder according to claim 2, further comprising a damping element which is arranged in the direction of extrusion at a distance forward of the elastic element on the outer circumference of the inner mandrel and which acts transversely to the direction of extrusion and cooperates with the inside wall of the mandrel rod tube.

6. The paste extruder according to claim 5, wherein the inner mandrel is provided with a recess, and wherein the damping element is a ring comprised of an elastic material and is inserted in the recess provided in the inner mandrel.

* * * * *